Patented Apr. 5, 1938

2,113,248

UNITED STATES PATENT OFFICE 2,113,248

PURIFYING BORIC ACID

Frantz F. Berg, Floral Park, N. Y., assignor to E. R. Squibb & Sons, New York, N. Y., a corporation of New York No Drawing. Application November 27, 1937,
Serial No. 176,891

10 Claims. (Cl. 23—149)

This invention relates to the purification of commercial-grade ("technical") boric acid.

Commercial-grade boric acid usually contains an impurity (or impurities) causing aqueous and alcoholic solutions thereof to appear hazy, a fact which considerably impairs the usefulness and acceptability of the boric acid, especially for pharmaceutical purposes. An analysis of such boric acid generally indicates the presence of minute quantities of arsenic, heavy metals, chlorides, sulfates, and borax (the last being of the order of .02% or less). Heretofore, the elimination of such impurities was effected only with considerable difficulty, ordinary recrystallization and/or repeated precipitation of the boric acid being ineffective.

It is the object of this invention to provide a simple and economical process for purifying commercial-grade boric acid.

It has been found that the haze-causing impurities in commercial-grade boric acid can be eliminated by recrystallizing the boric acid from an aqueous solution thereof containing a small proportion (e. g. about 0.05%) of a strong inorganic acid (e. g. hydrochloric or sulfuric acid). More specifically, the commercial-grade boric acid is dissolved in water to form a hot concentrated solution, which is filtered, treated with a small quantity of a strong inorganic acid (preferably concentrated sulfuric acid), and cooled; the boric acid is deposited out as a crystalline product, which yields crystal-clear aqueous and alcoholic solutions. Preferably, the mother liquor remaining after separating the precipitated boric acid is returned to the cycle of operations, i. e. is used as the aqueous solvent for the purification of a succeeding batch of commercial-grade boric acid.

The following example is illustrative of the invention: 300 pounds of commercial-grade boric acid is dissolved in 150 gallons of hot water; the solution is heated to about 93° C., and the specific gravity adjusted to about 1.04 by adding the requisite amount of commercial-grade boric acid; the solution is then filtered, and concentrated sulfuric acid is added to the filtrate until the pH thereof is 3.0 to 4.0; the solution is cooled to about 30° C. or lower, whereupon the boric acid separates in crystalline form; the crystals are separated from the mother liquor by centrifugation, and washed with cold distilled water. The boric acid thus obtained is exceptionally pure, forming crystal-clear aqueous and alcoholic solutions.

The invention may be variously otherwise embodied, within the scope of the appended claims.

I claim:

1. The process of purifying commercial-grade boric acid which comprises recrystallizing the boric acid from an aqueous solution thereof containing a small proportion of a strong inorganic acid.

2. The process of purifying commercial-grade boric acid which comprises recrystallizing the boric acid from an aqueous solution thereof containing a small proportion of concentrated sulfuric acid.

3. The process of purifying commercial-grade boric acid which comprises treating an aqueous solution thereof with a small proportion of a strong inorganic acid, and recovering the boric acid from the solution.

4. The process of purifying commercial-grade boric acid which comprises treating a hot aqueous solution thereof with a small proportion of a strong inorganic acid, and recovering the boric acid from the solution.

5. The process of purifying commercial-grade boric acid which comprises treating a hot concentrated aqueous solution thereof with a small proportion of a strong inorganic acid, and recovering the boric acid from the solution.

6. The process of purifying commercial-grade boric acid which comprises treating a hot concentrated aqueous solution thereof with a small proportion of concentrated sulfuric acid, cooling, and separating the precipitated boric acid.

7. The process of purifying commercial-grade boric acid which comprises preparing a hot concentrated aqueous solution thereof, adjusting the pH of the solution to 3.0–4.0 by adding a strong, inorganic acid, and recovering the boric acid from the solution.

8. The process of purifying commercial-grade boric acid which comprises preparing a hot concentrated aqueous solution thereof, adjusting the pH of the solution to 3.0–4.0 by adding concentrated sulfuric acid, and recovering the boric acid from the solution.

9. The process of purifying commercial-grade boric acid which comprises preparing a hot concentrated aqueous solution thereof, adjusting the pH of the solution to 3.0–4.0 by adding concentrated sulfuric acid, cooling to about 30° C. or less and separating the precipitated boric acid.

10. The cyclic process of purifying commercial-grade boric acid which comprises preparing a hot concentrated aqueous solution thereof, adjusting the pH of the solution to 3.0–4.0 by adding a strong inorganic acid, cooling, separating the precipitated boric acid, and using the mother liquor for the preparation of a solution of a subsequent batch of commercial-grade boric acid to be purified.

FRANTZ F. BERG.